(12) United States Patent
Armstrong

(10) Patent No.: US 7,834,565 B2
(45) Date of Patent: Nov. 16, 2010

(54) METHOD OF CONTROLLING A BRUSHLESS DC MOTOR

(75) Inventor: Laurence Armstrong, Oldham (GB)

(73) Assignee: Zetex Semiconductors PLC, Oldham (GB)

( * ) Notice: Subject to any disclaimer, the term of this patent is extended or adjusted under 35 U.S.C. 154(b) by 1388 days.

(21) Appl. No.: 11/261,867

(22) Filed: Oct. 28, 2005

(65) Prior Publication Data
US 2006/0119300 A1 Jun. 8, 2006

(30) Foreign Application Priority Data
Oct. 29, 2004 (GB) ................................ 0424049.5

(51) Int. Cl.
*H02P 25/08* (2006.01)
(52) U.S. Cl. .............................. 318/254.1; 318/400.01; 318/400.42
(58) Field of Classification Search .............. 318/254.1, 318/400.01, 400.42, 599
See application file for complete search history.

(56) References Cited

U.S. PATENT DOCUMENTS

| | | | | |
|---|---|---|---|---|
| 5,115,174 A | * | 5/1992 | Masuda et al. | 318/400.06 |
| 6,982,534 B2 | * | 1/2006 | Hahn et al. | 318/400.03 |
| 7,053,583 B1 | * | 5/2006 | Hazelton | 318/400.03 |
| 7,141,943 B2 | * | 11/2006 | Song et al. | 318/400.34 |

FOREIGN PATENT DOCUMENTS

| | | |
|---|---|---|
| GB | 1529834 | 10/1978 |
| GB | 2365531 | 2/2002 |

* cited by examiner

*Primary Examiner*—Walter Benson
*Assistant Examiner*—David S Luo
(74) *Attorney, Agent, or Firm*—Michael Best & Friedrich LLP

(57) ABSTRACT

A method of controlling a brushless DC motor of the type having a stator, comprising a stator winding excitable to generate a stator magnetic field, and a rotor, arranged to rotate with respect to the stator and comprising permanently magnetized material arranged to generate a rotor magnetic field to interact with the stator magnetic field to produce rotation of the rotor. The method comprises the steps of driving current through the stator winding to generate a stator magnetic field to interact with the rotor magnetic field, detecting rotor position with respect to the stator, and cyclically commutating the stator winding current according to rotor position as the rotor rotates. Each commutation cycle includes a drive portion during which current is driven through the stator winding in one sense and at the end of which the driving of current in said sense is ceased. The method further comprises the steps of during an initial portion of each drive portion, driving current through the winding such that the magnitude of the winding current increases and during an end portion of each drive portion, actively reducing the magnitude of the winding current.

26 Claims, 7 Drawing Sheets

METHOD OF CONTROLLING A BRUSHLESS DC MOTOR

This application claims priority from British Patent Application No. 0424049.5, filed Oct. 29, 2004, the entire contents of which are incorporated herein by reference.

FIELD

The present invention relates to a method of controlling a brushless DC motor. In particular, but not exclusively, it relates to a method of reducing current and voltage spikes generated during a commutation cycle.

BACKGROUND

Brushless DC motors are well known and are used in numerous applications. For example, brushless DC motors are commonly used to power fans, such as may be found within computers to cool components, are used in hard disk drives, CD players, and electric tools. A brushless DC motor typically includes a stator, comprising one or more windings (e.g. of wire) and a rotor comprising one or more permanent magnets. The rotor may, for example, comprise a ring magnet, or an annular array of magnets. The rotor may be arranged to rotate within the stator, or alternatively the rotor may be arranged to rotate around the outside of the stator.

To operate a brushless DC motor, current is passed through the stator windings, and a magnetic field is generated which interacts with the rotor so as to cause relative rotation between the stator and the rotor. Rotor rotation is controlled by controlling the current in the or each, stator winding in an appropriate manner. In the case of single phase brushless DC motors, comprising a single phase stator winding, this control involves the repeated excitation of the winding with current first in one sense, and then in the opposite sense. In the case of multiple phase windings, rotation may be achieved by arranging for the windings of the different phases to be successively excited, in effect to produce a rotating magnetic field with which the rotor interacts. This control of current in the windings of a DC brushless motor to achieve rotor rotation is known as commutation, and in general involves a periodic switching of current from one current path through the winding(s) to another. This switching may comprise the reversal of current direction through a winding and/or the switching of current path from one winding to another.

A further understanding of the operation of brushless DC motors will be obtained from the following discussion.

In general, the field generated by the excitation of the stator windings may be considered to comprise one or more pairs of North and South poles. This generated field interacts with the magnetic rotor, with each rotor pole being attracted to opposing stator poles and repelled by similar stator poles. As the stator is held steady, the effect is that the rotor rotates with respect to the stator. The speed of rotation of the rotor may be readily varied by controlling the magnitude and the timing of the current passing through the stator.

As the rotor rotates relative to the stator, opposite poles of the rotor and the stator are brought into alignment. In the case of single phase motors, it is then necessary to reverse the direction of current flow within the stator windings, such that the poles of the stator swap over, in order to allow the rotor to continue to rotate. As the rotor rotates yet further, the direction of current flow in the stator windings must be reversed yet again. Hence, for continued rotation, commutation of a single phase brushless DC motor comprises a periodic reversing of the direction of current flow through the stator windings. Thus, commutation is cyclical.

For a single phase motor, a single commutation cycle comprises a first drive portion, in which current is driven through the windings in a first direction, and a second drive portion, in which current is driven through the windings in a second, opposite direction. In this case, the length of the full commutation cycle is defined as the interval between the beginning of one first drive portion and the beginning of the next first drive portion, or, equivalently, as twice the interval between successive changes in direction of the current flowing within the stator windings.

For commutation to be effective, the motor must also comprise means for detecting the relative position of the rotor and the stator in order that the change in current direction occurs at the correct point to ensure continued rotation of the rotor. The position detection is typically achieved using a Hall effect magnetic sensor device (or a number of such devices), which generates an output signal indicative of the distance between the sensor and the nearest pole of the rotor. Other forms of rotor position detection may, of course, be used.

A brushless DC motor is typically operated using a switching circuit, for supplying the current to the stator windings, and a controller to control the switching circuit. The switching circuit and/or the controller may be comprised in the motor itself, or may be separate items. For single phase brushless DC motors the switching circuit is typically an H-bridge circuit arranged between positive and negative (or ground) power supply rails. Winding current direction and timing is controlled by appropriate control of the switching elements within the H-bridge. The controller is typically fabricated as an integrated circuit, though may alternatively be formed from discrete components. The controller has inputs derived from the position detector (e.g. Hall sensor) to sense the position of the rotor, and control inputs to set parameters such as motor speed and direction. The controller has outputs, which supply switching signals to control the switching elements of the H-bridge.

In prior art commutation methods, for single phase motors during the first drive portion of each commutation cycle an average voltage is applied across the stator windings (using PWM techniques, for example) in a first sense, causing a current to flow within the windings in a first direction. As the stator and rotor poles come close to alignment the drive portion ends and the applied voltage is removed, in effect to switch the current "off". The timing of switch off is determined by the signal from the position detector. There may be a short commutation delay before the second drive portion, in which the same average voltage is applied across the stator windings (if constant rotor speed is required) but in the opposite sense. This causes a current to flow within the windings in the opposite direction. The commutation delay is to ensure that at the point at which the stator and rotor poles pass each other, substantially no current is flowing within the stator windings. This is important to ensure that slight inaccuracies in the timing of the commutation do not cause the motor to slow due to the stator and rotor poles being swapped too soon. The duration of the commutation cycle is equal to the sum of the durations of the first and second drive portions and the two commutation delays (i.e. the delay between the first and second drive portions of one cycle, and between the second drive portion of one cycle and the first drive portion of the next cycle).

The average voltage may be applied across the stator windings in the first and in the second, opposite sense by determining which switching elements within the H-bridge are open and closed. During each commutation cycle, at each moment of current "switch off" (i.e. at the end of the first drive portion and at the end of the second drive portion) typically all switching elements within the H-bridge are opened to interrupt current flow from the supply rails through the stator windings. In other words, current drive to the windings is removed (i.e. it ceases). This switch state is maintained during the commutation delay.

However, it will be appreciated that at these "switch off" points large currents are flowing through the windings. Thus, when all switches are opened (i.e. to remove the applied voltage) a large back EMF is generated (i.e. a large voltage spike is developed across the windings). This large voltage spike can in turn give rise to a large and undesirable current spike. The magnitudes of these voltage and current spikes may be many times greater than the average values of drive voltage and winding current experienced during each commutation cycle.

The problem of the large back EMF and the consequent current spike is exacerbated by the fact that even when the average voltage applied across the stator windings is constant during a drive portion of the commutation cycle, the current within the stator windings tends to rise towards the end of the drive portion of the commutation cycle. This rise in the stator current is due to the change in the inductance of the stator windings associated with the changing relative position of the rotor.

These large voltage and current spikes induce vibration in the motor as the stator windings and the rotor magnets vibrate in sympathy with the changes in energy. This vibration causes audible clicks, which is usually undesirable. Additionally, electrical noise may be generated on the motor voltage supply that can be damaging to other equipment, such as CPUs that share the same power supply. In certain arrangements, the electrical noise on the voltage supply is a result of current passing through the parasitic body diodes of the transistors that form the switching elements (or any external diodes present) within the switching circuit. These body diodes act as charge pumps, raising the voltage on the supply rail temporarily higher than its normal level. In order to prevent the voltage spike on the supply rail from damaging connected equipment it is known to isolate the brushless DC motor via a blocking diode, arranged on the positive power supply rail, such that current may flow from the power supply network to that part of the supply rail local to the motor, but not in the reverse direction during locally generated voltage spikes.

The size of the current and voltage spikes at the switching points in the commutation cycle are dependent on the magnitude of winding current at these points. They are, therefore, partly dependent upon the timing of these switch-off points. If current switch-off is done earlier in the cycle, i.e. when the poles of the rotor and the stator are further apart, then the sizes of the spikes can be reduced. This is because, as described above, the stator current tends to rise towards the end of the drive portion of the commutation cycle due to inductance change caused by the changing position of the rotor relative to the stator. By switching off earlier, excessive rises in winding current can be avoided. The switch-off timing (i.e. the timing of the removal of the applied voltage) may conveniently be varied by moving the position of a Hall sensor, arranged to detect rotor position, around the circumference of the stator.

However, removing the applied voltage earlier necessarily results in an increase in the commutation delay, otherwise the stator poles will be switched over before the rotor poles have passed causing rotation of the rotor to be resisted. If this occurs the motor may slow or even stop due to the rotor not having sufficient inertia to rotate past the position in which the poles are aligned. A side effect of increasing the commutation delay is that the proportion of time during each commutation cycle for which the motor is not being powered is increased, resulting in a decrease in speed, which must be counteracted by supply of a greater current to the stator windings throughout the rest of the cycle. Additionally, the rate of rotation of the rotor will vary in an uncontrolled manner throughout each commutation cycle.

The large current and voltage spikes may also physically damage motor components, in particular the switching elements. A known technique to address this problem of large currents and voltages is to use components having higher voltage and current ratings than the maximum expected peak values at the end of the drive portion(s) of each commutation cycle. However, these components, notably transistors, are therefore rated for significantly higher voltages and currents than is required for the remainder of the commutation cycle. It is undesirable to use over specified transistors as the internal resistance loss is increased by the use of higher voltage components, which therefore leads to energy being wasted. Additionally, the cost of electronic components typically increases as the voltage and current ratings increase, resulting in a more expensive motor.

The torque generated within a brushless DC motor is inversely proportional to the square of the distance between opposing poles of the rotor and the stator. Additionally, the torque is proportional to the size of the current passing through the stator windings, as this affects the magnitude of magnetic flux density generated within the electromagnet. Towards the end of each drive portion of each commutation cycle, when the winding current rises due to inductance change as discussed above, the opposing poles of the rotor and the stator come close together. Consequently, this winding current rise generates little torque, and may therefore be considered to be wasted energy.

The current spike due to the back EMF may also be considered to be wasted energy. A partial solution to the problem of wasted energy is to provide a large capacitor across the voltage supply to the H-bridge, such that at the end of each drive portion of the commutation cycle when the back EMF of the coil creates a large voltage spike across the capacitor this excess voltage charges up the capacitor, storing energy to help power the next commutation cycle. However, using a capacitor to store electrical energy is inefficient because in order to charge the capacitor the charge current must pass through the body diodes of the transistors forming the switching elements (or external diodes if these are present). It is preferable not to have to try to recover this energy in the first place. Additionally, due to the large value capacitance required the capacitor may be physically large. There may not be physical space within a motor housing for the capacitor. Consequently, the result is a compromise between a medium sized capacitor and accepting some voltage spike on the voltage supply to the H-bridge, necessitating some over specifying of components. Also, this approach does not have any impact on the problems of over specified components and acoustic/electrical noise as described above.

When the supply voltage is applied across the stator windings at the beginning of each drive portion of each commutation cycle the current flowing through the coil builds steadily to an early peak. This gradual rise is due to the inductance of the stator windings. The motor is most efficient during the early part of each drive portion as the opposing stator and rotor poles are further apart. Consequently, this early peak represents the most efficient part of the commutation cycle.

A further known method of reducing the size of the voltage and current spikes at the end of each drive portion of the commutation cycle is to limit the maximum current that may flow through the stator windings. This has the effect of flattening the current profile throughout the whole drive portion. However, while this method does remove the worst effects of the voltage and current spikes in terms of noise and damage to components, this method is inefficient. The unwanted current spike cannot be limited to a current level lower than the pulse at the beginning of each drive portion without unduly limiting that part of the cycle also. Therefore, the best that can be achieved with this approach is a slight flattening of the current waveform over the whole of the commutation cycle. As discussed above, the early part of the drive portion of the commutation cycle, when the like poles are closest together, provides the greatest torque for a given current passing through the stator windings. Therefore, it is desirable not to limit the current flow during the early part of the commutation cycle, whilst addressing the problem of voltage and current spikes generated at the ends of the drive portions of the commutation cycle. This cannot be achieved with basic current limiting techniques.

SUMMARY

It is an object of the present invention to obviate, or mitigate, one or more of the problems described above.

According to a first aspect of the present invention there is provided a method of controlling a brushless DC motor of the type having a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor, the method comprising the steps of:

driving current through the stator winding to generate a stator magnetic field to interact with the rotor magnetic field;

detecting rotor position with respect to the stator; and cyclically commutating the stator winding current according to rotor position as the rotor rotates, each commutation cycle including a drive portion during which current is driven through the stator winding in one sense and at the end of which the driving of current in said sense is ceased, wherein the method further comprises the steps of:

during an initial portion of each drive portion, driving current through the winding such that the magnitude of the winding current increases; and during an end portion of each drive portion, actively reducing the magnitude of the winding current.

The step of driving current during the initial portion may alternatively be described as a step of controlling current. Similarly, the step of actively reducing current during the end portion may be described as a step of controlling current.

Thus, in a method in accordance with the present invention, during an end portion of each drive portion the magnitude of the winding current is actively reduced (i.e. its magnitude falls during this end portion) so as to reduce the eventual current magnitude at the end of the drive portion. The reduction is typically a progressive one. It may be a linear reduction, for example, or may take an alternative form.

It should be noted that during the end portion of the drive portion, current is still being actively driven through the stator winding; the magnitude of the winding current is not falling because drive has ceased, rather as a result of appropriate change in the active drive (e.g. a reduction in a drive voltage).

An advantage of the present invention is that by selectively reducing the current flowing within the stator windings towards the end of a drive portion of a commutation cycle, current and voltage spikes that in the past have been generated at the end of the drive portion may be avoided, or at least their magnitudes may be reduced without limiting the current flowing within the stator windings throughout the rest of the drive portion.

Another advantage is that by actively reducing winding current at the end of a drive portion, the efficiency of the motor is increased.

Yet another advantage is that the commutation delays can be reduced, thereby further improving motor efficiency.

The end portion may immediately succeed the initial portion, or alternatively there may be another portion in between. During any such intermediate portion, winding current may be constant, or alternatively it may vary. For example, during an intermediate portion the winding current magnitude may decrease. This may be a passive reduction, resulting not from any change in current drive, but from a change in inductance as the position of the rotor changes with respect to the stator.

The step of actively reducing may comprise reducing the magnitude of the winding current such that its value at the end of the drive portion is less than 30% of the average value of winding current magnitude during the drive portion.

In certain preferred embodiments the magnitude of the winding current is reduced substantially to zero by the end of the drive portion.

The step of driving current during the initial portion may comprise increasing the magnitude of winding current to a peak value during said initial portion, and the step of actively reducing may then comprise reducing the magnitude of the winding current below said peak value, for example to less than 30% of the peak value.

In certain preferred embodiments, the method may comprise the step of controlling winding current during each drive portion such that the magnitude of the winding current increases from substantially zero, at the beginning of the initial portion, up to a peak value, and then decreases substantially continuously from said peak value throughout the remainder of the drive portion, to the end of the end portion.

The method may also comprise the steps of detecting rotor speed and adjusting the length of the end portion, during which winding current is actively reduced, according to rotor speed. For example, this adjustment may comprise reducing the length of the end portion as rotor speed increases.

In certain preferred embodiments the step of actively reducing further comprises the steps of generating a current reduction control signal indicative of the desired current reduction during the end portion from a signal indicative of the position of the rotor; and reducing the magnitude of the winding current in response to the current reduction control signal. The step of generating the current reduction control signal may comprise providing rotor position sensing means to provide the signal indicative of the position of the rotor. In certain embodiments, the rotor position sensing means is arranged to detect the rotor magnetic field and output a rotor position signal. The rotor position sensing means may conveniently comprise a Hall effect device providing a signal to an amplifier. The current reduction control signal may be derived using a method including integration of the Hall amplifier output and comparison with a saw tooth signal having a frequency equal to the commutation frequency.

In certain preferred embodiments, the step of actively reducing the magnitude of the winding current comprises reducing a drive voltage applied across the winding. The drive voltage may be a PWM voltage, and the step of reducing the drive voltage applied across the winding may thus comprise reducing a duty cycle of the PWM voltage.

Alternatively, or additionally, the step of actively reducing may comprise providing a component having a controllable variable resistance in series with the stator windings and increasing said variable resistance. The component may, for example, comprise a variable resistor, or a transistor having a variable resistance.

The method may be used to run a brushless DC motor at constant speed.

Another aspect of the invention provides control apparatus for a brushless DC motor, of the type comprising a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor, the control apparatus comprising:

current drive means (a current drive) adapted to drive current through the stator winding to generate a stator magnetic field;

rotor position detection means (a rotor position detector) adapted to provide a rotor position signal; and commutation means (commutation apparatus) adapted to cyclically commutate the stator winding current according to the rotor position signal as the rotor rotates, each commutation cycle including a drive portion in which the current drive means is adapted to drive current through the stator winding in one sense and at the end of which the current drive means is adapted to cease current drive;

wherein the control apparatus further comprises means arranged to increase the current through the winding during an initial portion of each drive portion and means arranged to actively reduce the current through the winding during an end portion of each drive portion.

The rotor position detection means in certain embodiments is arranged to detect the rotor magnetic field.

The control apparatus may be arranged so as to implement one or more of the preferred features of the control method in accordance with the first aspect of the present invention. For example, the current drive means may be arranged to drive current through the stator winding by applying a PWM voltage across the winding, and the control apparatus may actively reduce the current through the winding during the end portion of each drive portion by reducing the duty cycle of the PWM voltage.

Yet another aspect of the invention provides a method of controlling an actuator of the type having a stator, comprising a stator winding excitable to generate a stator magnetic field, and an armature, arranged to move with respect to the stator and comprising permanently magnetised material arranged to generate an armature magnetic field to interact with the stator magnetic field to produce movement of the armature, the method comprising the steps of:

driving current through the winding to generate a stator magnetic field to interact with the armature magnetic field;

detecting armature position with respect to the stator; and commutating the winding current according to armature position as the armature moves, the commutation including a drive portion during which current is driven through the winding in one sense and at the end of which the driving of current in said sense is ceased, wherein the method further comprises the steps of:

during an initial portion of the drive portion, driving current through the winding such that the magnitude of the winding current increases; and during an end portion of the drive portion, actively reducing the magnitude of the winding current.

Further objects, and advantages of the present invention will become apparent from the following description.

BRIEF DESCRIPTION OF THE DRAWINGS

The present invention will now be described, by way of example only, with reference to the following drawings, in which.

DETAILED DESCRIPTION

Figure 1:
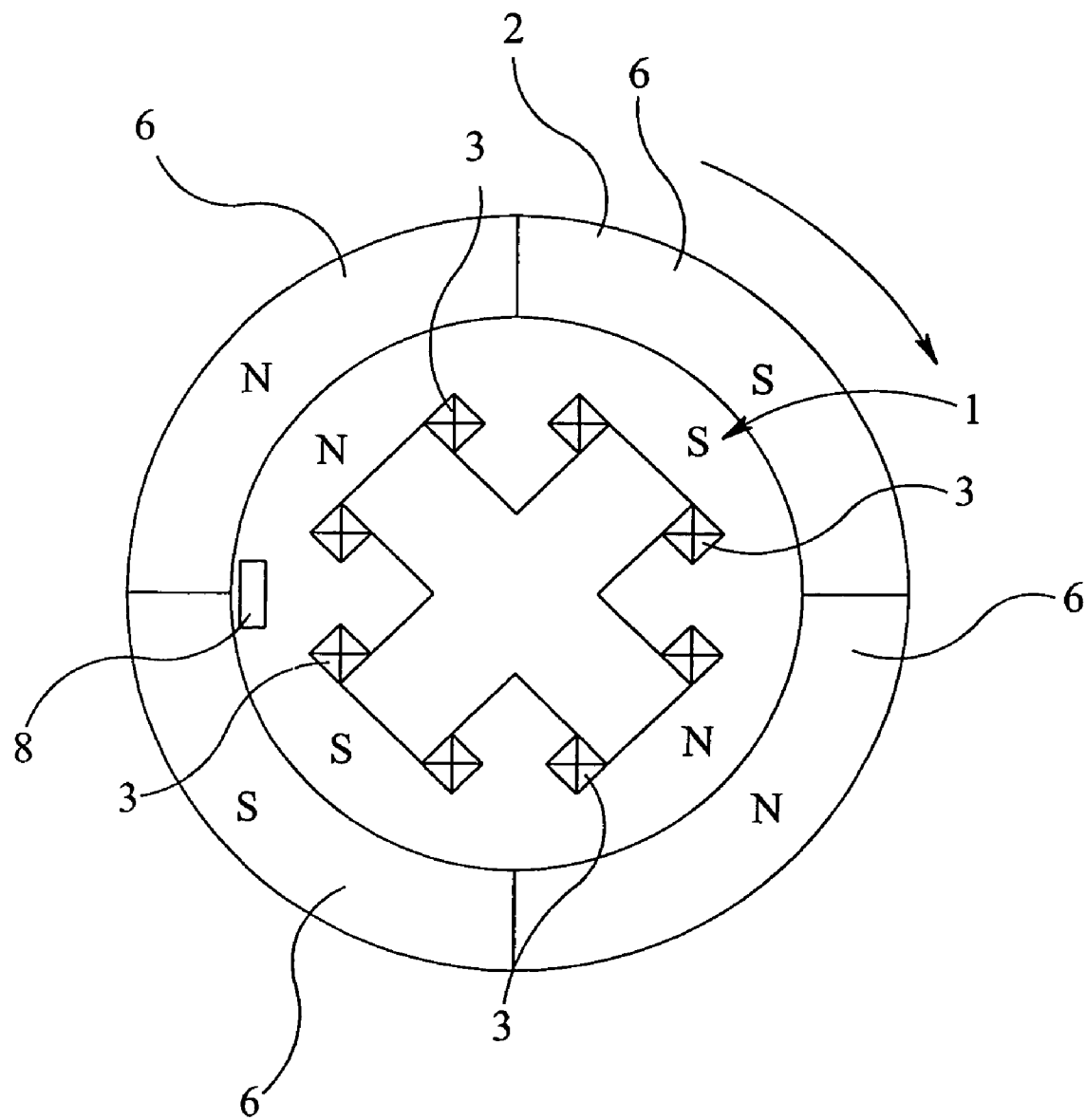
FIG. 1 schematically illustrates a conventional brushless DC motor, which may be controlled using a control method or control apparatus embodying the present invention.

Referring first to FIG. 1, this schematically illustrates a conventional single phase brushless DC motor, comprising stator 1 and rotor 2. This motor may be controlled using a control method or apparatus embodying the present invention, and may be combined with control apparatus in certain embodiments of the invention. Stator 1 comprises stator windings 3, shown here as being wound around pole pieces such that when current passes through the windings 3 two pairs of North and South poles are created as shown. In other words, excitement of the stator windings generates a stator magnetic field. The rotor comprises permanently magnetised material arranged to generate a rotor magnetic field which interacts with the stator field to produce rotation. In certain embodiments, the rotor comprises one or more permanent magnets. In the present example, the rotor comprises a ring of magnets 6 having two pairs of poles as shown. The rotor 2 rotates about an axis passing through the centre of stator 1. A Hall effect sensor 8 is arranged to detect the rotor position. Alternatively, stator windings 3 may be arranged in a ring around a central rotating rotor.

In FIG. 1, the motor is shown with the poles almost aligned. The rotor 2 is repelled by the poles of the stator 1 such that it rotates in the direction shown by 7. As the rotor 2 rotates, such that opposite poles on the stator 1 and rotor 2 move into alignment the direction of current flow within the stator windings 3 reverses. This current reversal (a commutation) ensures that onward motion of the rotor 2 continues.

Figure 2:
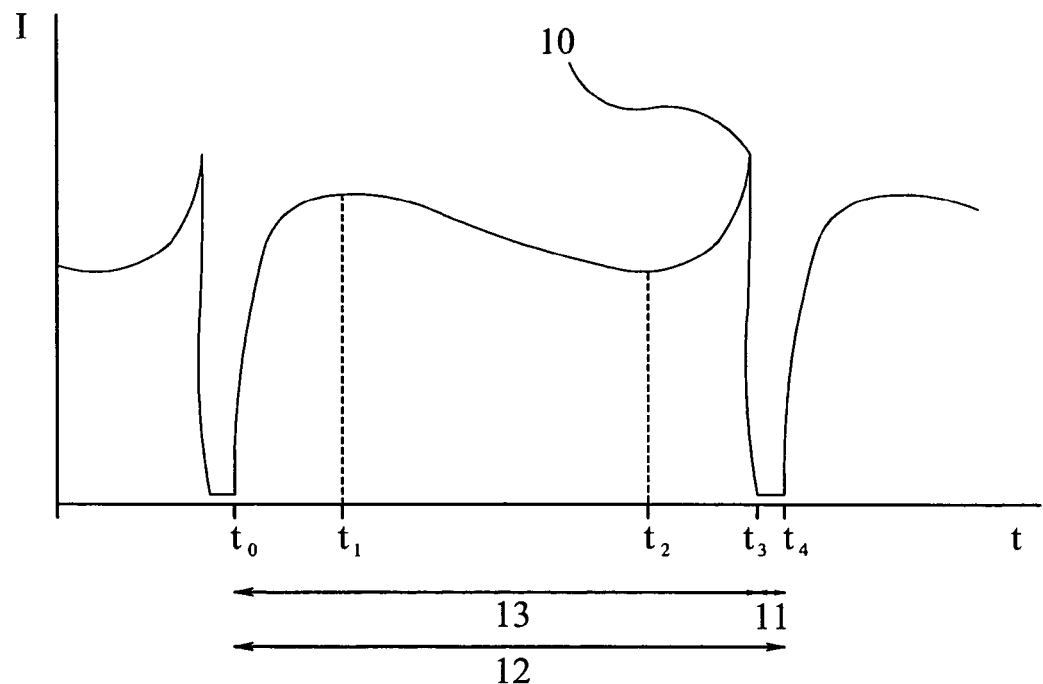
FIG. 2 illustrates the variation, with time, of current passing through the stator windings of a conventional brushless DC motor, controlled using a conventional commutation method.

Referring now to FIG. 2, this illustrates the current passing through the stator windings 3 of a conventional single phase brushless DC motor, illustrating the problem of an increase in current towards the end of a drive portion of the commutation cycle. The current signal is plotted on the Y-axis against time on the X-axis.

At time $t_0$, a voltage supply is first applied across the stator windings 3 at the beginning of a drive portion of the commutation cycle. This gives rise to current flow. The current passing through the windings 3 builds rapidly to an initial peak at time $t_1$. The current does not rise to its maximum value immediately due to the inductance of the stator windings 3. As discussed in the introduction, it is during this early part of the commutation cycle that the motor is most efficient in terms of transferring energy from a stator windings 3 to the rotor 2, i.e. converting electrical energy into kinetic energy.

As the rotor turns, and the poles move apart, the current passing through the stator windings falls off slightly to a low at time $t_2$. This is due to the interaction of the magnetic field generated by the current passing through the stator windings 3 and the magnetic field of the rotor 2 affecting the inductance of the stator windings 3 as the stator and rotor poles move apart. As the rotor 2 rotates further, bringing the rotor poles towards alignment with the similar poles on the stator windings 3, the current starts to rise as the rotor magnets affect the inductance of the stator windings.

The voltage applied across the stator windings is switched off at time $t_3$, by which time winding current has risen to a peak 10 due to inductance change caused by the changing position of the rotor 2 relative to the stator 1. By switching off when such a large current is flowing, a large back EMF is generated which can in turn generate a large current spike as described above. The winding current then drops back towards zero, and there is then a short commutation delay 11 before the next drive portion of the commutation cycle begins at time $t_4$. After each drive portion 13, the direction of current flowing through the stator windings 3 is reversed in order to ensure that the rotor 2 continues to rotate in the same direction. This is achieved by controlling the states of the switching elements within the H-bridge such that the supply voltage is applied across the stator windings in the opposite sense. However, it is convenient to measure the current passing through the stator windings 3 at the ground return of the switching circuit driving the stator windings. Consequently, the second drive portion of commutation cycle beginning at time $t_4$ is shown as also having a positive current, although it will be appreciated that within the stator windings 3 the current will be reversed. In other words, it will be appreciated that in FIG. 2 the variation of only the current magnitude with time is shown, not its sense. The winding current in the second drive portion of the cycle, beginning at $t_4$, is in the opposite sense to that during the interval $t_0$-$t_3$. The current variation during the next drive portion has substantially the same profile as that in the first drive portion ($t_0$-$t_3$) and hence the portion of FIG. 2 between $t_0$ and $t_4$ is indicative of winding current variation during the entire commutation cycle. Portion 13 is representative of each drive portion, portion 11 is representative of each commutation delay, and portion 12 is representative of half a commutation cycle.

As discussed above in the introduction, the current spike 10 is inefficient at transferring energy to the rotation of the rotor 2. The half commutation cycle 12 depicted in FIG. 2 is illustrative of the problem of current spikes for a brushless DC motor having a relatively large commutation delay 11 between consecutive drive portions. With a conventional brushless DC motor, conventionally commutated, there will always be some current spike towards the end of each drive portion. However by increasing the size of the commutation delay the spike may be partially reduced. This may be achieved by altering the position of the Hall sensor relative to the stator such that the current is terminated lower down the rising waveform. The current supply is turned off at time $t_3$ in order to reduce the size of the current spike. For other configurations of motor, the current spike may be significantly greater than the desired pulse at time $t_1$ towards the beginning of the commutation cycle 12. Commutation delay 11 is necessary to ensure that the current is not supplied to the stator windings 3 before the stator and rotor poles have passed each other.

Figure 3:
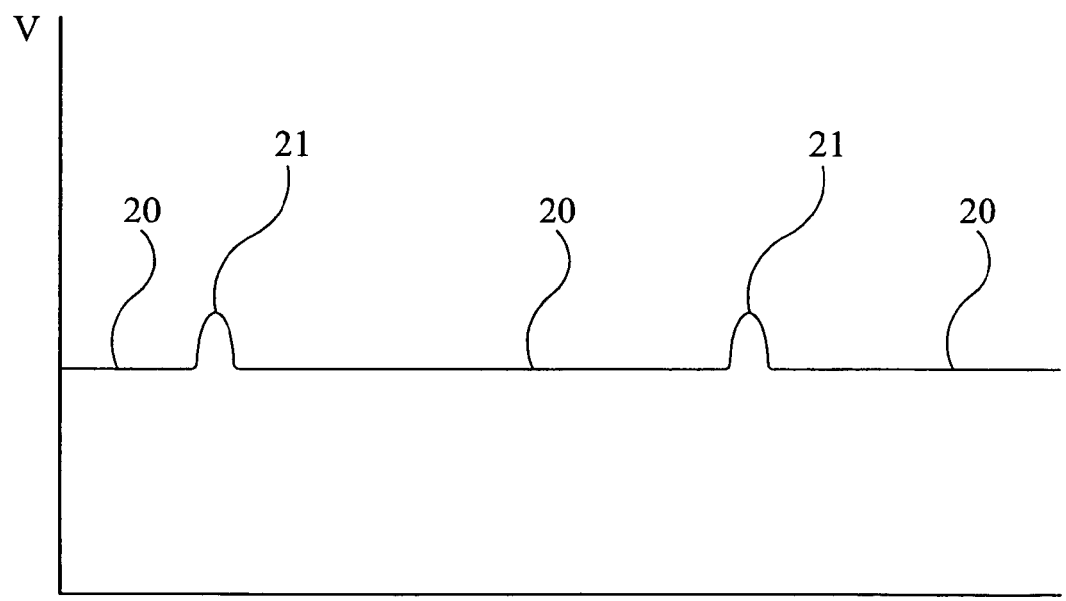
FIG. 3 illustrates voltage spikes created on a voltage supply to the brushless DC motor whose winding current is shown in FIG. 2.

The current spike 10 at the end of each drive portion of each commutation cycle also generates a voltage spike on the voltage supply due to the charge pump effect of the transistor body diodes (or alternatively any external diodes present) as discussed above in the introduction. FIG. 3 illustrates this effect. The normal voltage supply level 20 rises rapidly to peak 21 at the end of each drive portion of each commutation cycle at the time of the current peak 10, before dropping back to the normal level 20.

The speed of a brushless DC motor may be varied by varying the voltage applied across the stator windings 3 using linear techniques such as a variable resistor or transistor in series with the coil. However, it is increasingly common to use Pulse Width Modulation (PWM) techniques to switch the current passing through the stator windings on and off at a high frequency during the drive portion 13 of the commutation cycle, i.e. between $t_0$ and $t_3$. The average voltage applied across the stator windings during the drive portion is therefore lower than the peak voltage applied during each applied voltage pulse. Consequently, the average current within the coil is dependent upon the PWM duty cycle of the switching signal supplied to the H-bridge switching elements at any time. PWM serves to vary the amount of energy stored within the coil as magnetic flux.

PWM operates by generating a very fast oscillating signal, typically for motor controllers at a frequency of around 25 kHz. This oscillating signal is then compared with a reference or control signal generating a pulsed output at the same frequency but with a variable duty cycle dependent upon the magnitude of the control signal. The duty cycle may vary between 100% (pulse signal always high) and 0% (pulse signal always low). The PWM signal may then be used to drive circuits, in this instance the stator windings 3, such that the signal applied to the windings is either fully on or fully off, but the average current flowing through the coil is variable. Therefore, the speed of the motor may be varied by an externally generated control signal driving the PWM oscillator.

Figure 4:
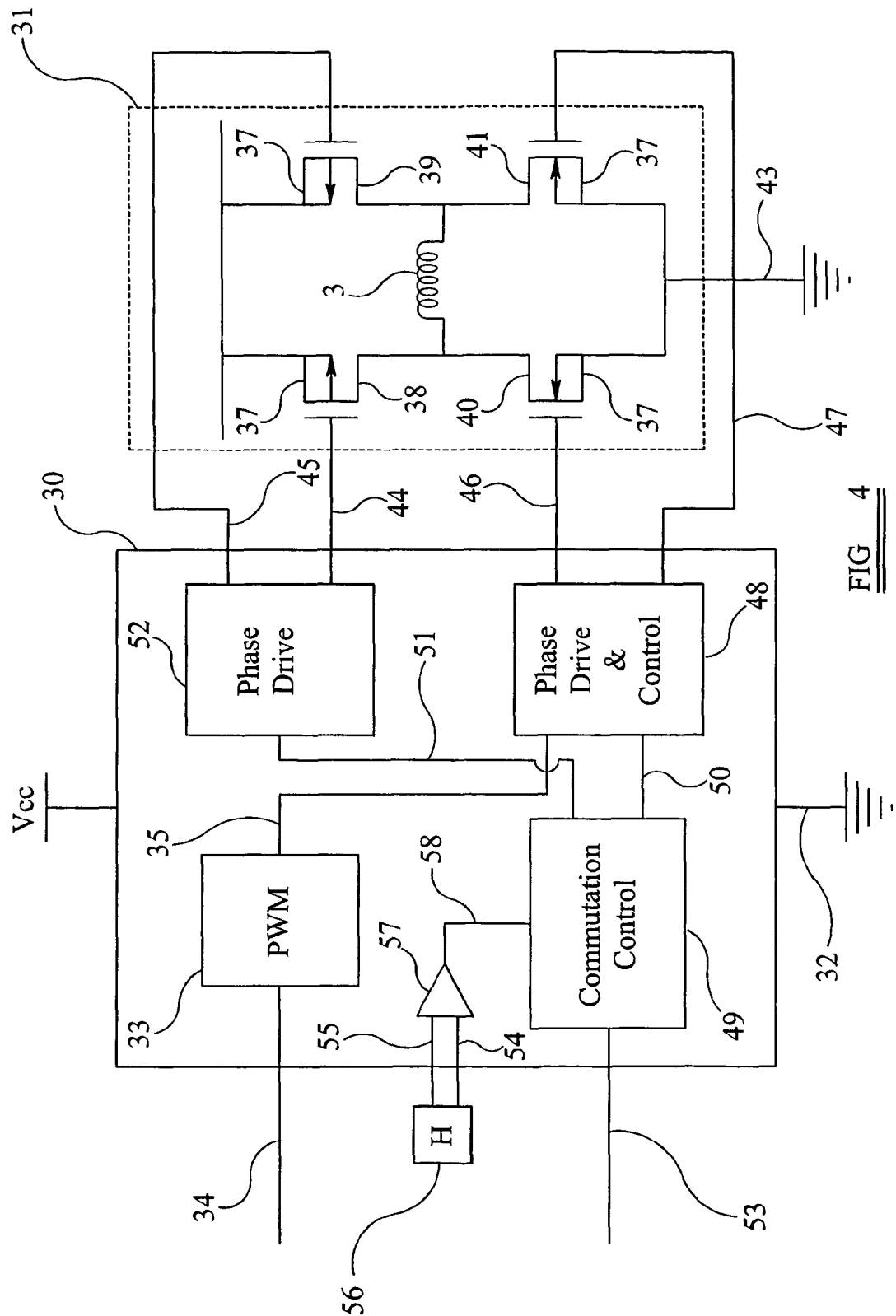
FIG. 4 schematically illustrates a conventional switching circuit and controller for a brushless DC motor, and which may be used in embodiments of the present invention.

FIG. 4 schematically illustrates a simplified known brushless DC motor controller 30 providing variable speed switching signals via PWM to switching circuit 31. Controller 30 is depicted as being integrated onto a single chip, having a positive voltage supply $V_{cc}$ and a connection to ground 32 (or a connection to a negative voltage supply).

Stator windings 3 are controlled by switching circuit 31. The flow of current through the stator windings 3 is controlled by a H-bridge circuit 37 comprising transistors 38, 39, 40 and 41 which form the switching elements, voltage supply $V_{cc}$ and ground return 43. The voltage supply $V_{cc}$ and ground return 43 for the switching circuit 31 may be the same as for the controller 30, or they may differ, for instance if the motor is driving a large load and consequently needs a larger power supply.

Current is allowed to pass through the stator windings 3 in a first direction by turning on transistors 38 and 41 and turning off transistors 39 and 40. Current is allowed to pass through the stator windings 3 in a second opposite direction by turning on transistors 39 and 40 and turning off transistors 38 and 41. The times at which transistors 38, 39, 40, 41 are turned on and off are determined by the switching signals supplied to the gates of the transistors on lines 44, 45, 46, 47 respectively. The switching signals are generated by the controller 30.

In this example, transistors 38-41 are MOSFETs. Transistors 38 and 39 are high side p-channel MOSFETs and transistors 40 and 41 are low side n-channel MOSFETs. The signals on lines 44-47 are applied to the gate of transistors 38-41 respectively. When the signal on line 44 or 45 is low transistor 38 or 39 conducts. When the signal on line 46 or 47 is high transistor 40 or 41 conducts.

Transistors 38 and 39 should not be turned on at the same time. Similarly, transistors 40 and 41 should not be turned on at the same time. As described above, the current passing through stator windings 36 is conveniently measured at the ground return, i.e. at the point where the connections to transistors 40 and 41 and ground connection 43 meet.

Controller 30 comprises a PWM modulator 33 having a speed control signal input 34 derived from speed control circuitry outside of the controller 30. Input 34 is used to set the speed of the motor and may include feedback from the motor monitoring the speed of the motor. The means by which input 34 is derived may be entirely conventional, and as such will not be described further here. The output 35 from the PWM modulator 33 is a pulse width modulated switching signal having a duty cycle proportional to the level of input 34.

In certain embodiments of the invention the motor is controlled such that the rotor rotates at substantially constant speed with respect to the stator (in other words, the control is such that the average angular velocity of the rotor is substantially constant from one revolution, and hence from one full commutation cycle, to the next). Even though rotor speed is constant, winding current is actively reduced in the end portion of each drive portion of the commutation cycle.

Thus, the motor may run at a constant speed, in which case input 34 is constant or may be omitted entirely. Additionally, further inputs to the pulse width modulator 33 may be included, such as current feedback to control the current at motor start up and under stall conditions. These additional inputs may be entirely conventional, and as such will not be described further here.

PWM modulator switching signal output 35 is supplied to phase drive and control circuit 48. Circuit 48 applies the PWM signal 35 to either line 46 or 47, or neither, depending upon the signal supplied to circuit 48 by commutation control circuit 49 on control line 50. Control circuit 49 additionally supplies a second control signal on control line 51 to phase drive circuit 52. Phase drive circuit 52 switches transistors 38 and 39 on and off via signals supplied on lines 44 and 45.

Together phase drive and control circuit 48 and phase drive circuit 52 comprise the drive means for the controller. The result is that commutation control circuit 49 controls the time at which transistors 38-41 are switched on and off, and phase drive and control circuit 48 ensures that when transistors 40 and 41 are switched on the signal supplied to the gate of either transistor 40 or transistor 41 is the PWM signal supplied on line 35. Therefore, the high side H-bridge switches 38 and 39 are used to provide commutation and determine the duration of the drive portion of the commutation cycle for the stator windings 36, while low side H-bridge switches 40 and 41 provide commutation, timing of the drive portion and PWM speed control. In the alternative, the PWM speed control may be performed by the high side switches 38 and 39, by supplying these with the PWM switching signal.

Commutation control circuit 49 ensures that only transistor pairs 38 and 41 or 39 and 40 may be switched on at any one time, or alternatively that all transistors are switched off during the commutation delay 11, or when the motor is disabled. PWM modulator 33 provides speed control to the motor by ensuring that the current supplied to stator windings 3 by H-bridge 37 is PWM modulated.

Commutation control circuit 49 comprises one or more control inputs 53. For instance there may be inputs to disable the motor and vary the commutation delay.

Controller 30 further comprises inputs 54 and 55 from Hall Sensor 56. Hall sensor 56 is used to detect the position of the rotor 2 relative to the stator 1. Hall sensor 56 provides a differential signal to inputs 54 and 55. In one embodiment, the Hall sensor may be a "naked" Hall sensor, which normally outputs half its supply voltage to each of its outputs. When a pole of the first orientation passes one output goes to a higher voltage and the other output goes to a lower voltage, and vice versa. In an alternative embodiment, the sensor may be a buffered Hall sensor, which provides a high or low signal on an output provided to either input 54 or 55. The other input to Hall amplifier 57 is held halfway between the supply voltages to the Hall sensor. Hall amplifier 57 provides an output to control circuit 49 dependent upon the difference between its inputs. Hall amplifier 57 provides a pulse train on output 58, registering either a positive or a negative pulse as each pole of the rotor passes. Consequently, the pulse train on output 58 is at the frequency of the commutation cycle. This information is used within commutation control circuit 49 to determine the position of the rotor 2 relative to the stator 1, and consequently determine when each commutation cycle 12 should start and finish.

For a controller 30, in accordance with the present invention, the PWM functionality is further used to specifically control the voltage applied across the stator windings 3 and consequently the current flowing through the stator windings 3 towards the end of each drive portion of the commutation cycle, such that the current is gradually reduced, thereby avoiding the unwanted current spikes and large back EMFs at the end of each drive portion. In certain embodiments, the current is reduced to zero at the end of the drive portion, although it may alternatively be reduced substantially, but to a non-zero value (e.g. close to zero) thereby substantially reducing any voltage and/or current spikes which may then appear when the current is switched off completely. Alternatively, if the current is reduced to zero earlier then this gives a greater tolerance to timing inaccuracies at the point of commutation.

To achieve this active current reduction, towards the end of each drive portion 13 of the commutation cycle 12, the duty cycle of the pulse signal on lines 46 or 47 is reduced, such that the proportion of the time that the voltage is applied across the windings is reduced. This has the effect of gradually reducing the average voltage applied across the windings and therefore gradually reducing the current flowing through the stator windings 3.

Figure 5:
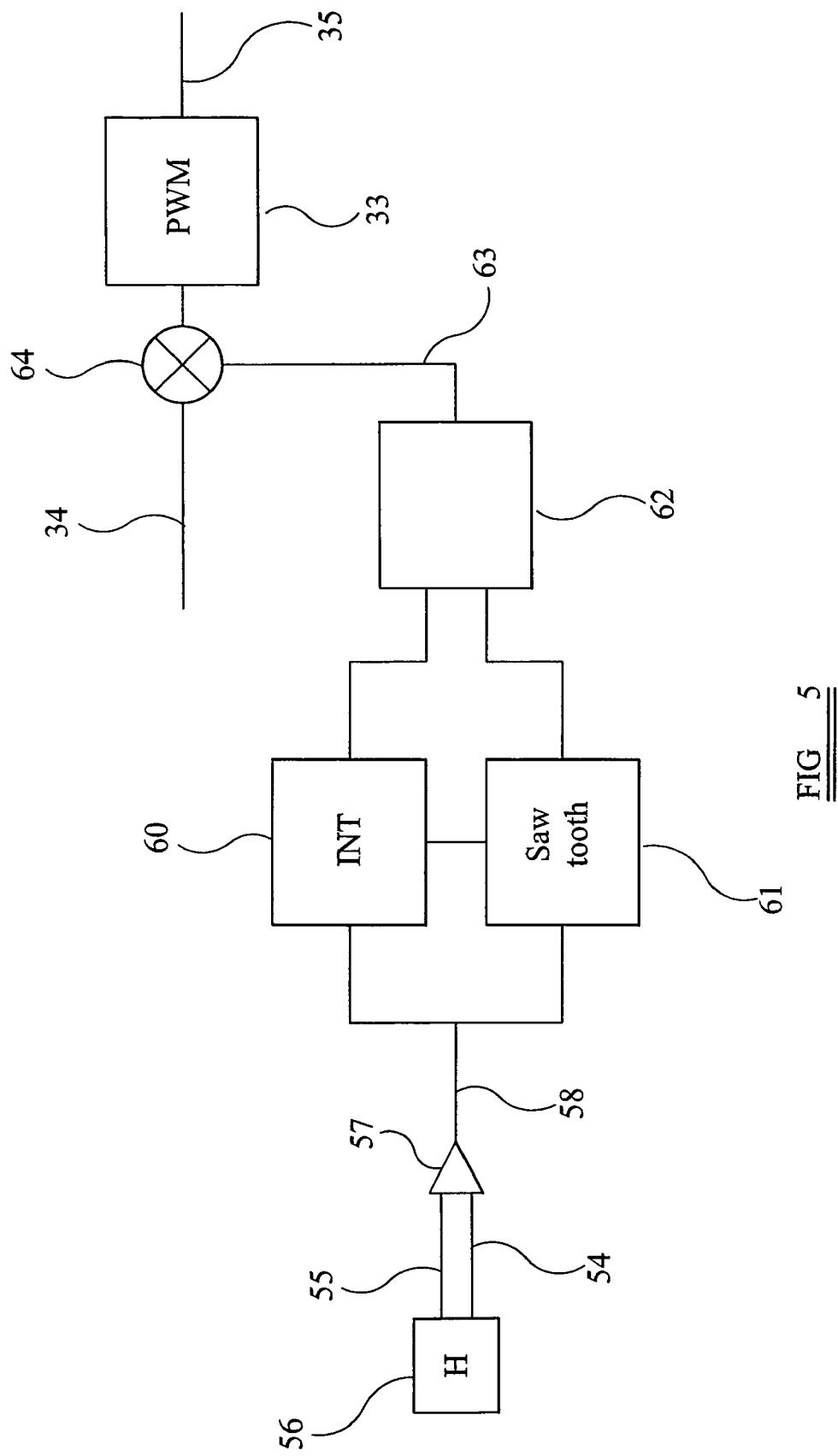
FIG. 5 schematically illustrates a modification to a controller for a brushless DC motor in accordance with an embodiment of the present invention.

Referring to FIG. 5, this illustrates a partial circuit for achieving this gradual reduction in current within the stator windings 3 towards the end of each drive portion 13 of the commutation cycle 12 in accordance with an embodiment of the present invention.

In order to be able to correctly time the reduction in current passing through the coil, it is necessary to generate a waveform indicative of the commutation cycle within the controller. Typically, the portion of the drive portion, during which the current supply to the stator windings is reduced, is a constant proportion of the drive portion regardless of the speed of rotation of the rotor. As the speed of rotation of the rotor changes the absolute time period during which the current supply to the stator windings is reduced will vary. However, it may be desirable to vary the proportion of the drive portion during which the current supply to the stator windings is reduced during fine tuning of the technique for some applications.

The outputs of existing Hall effect sensor 56, conventionally used to determine the commutation timings, are additionally used to generate waveforms indicative of both the speed of the motor and each commutation cycle. As before, the outputs of Hall effect sensor 56 are connected to inputs 54 and 55 of Hall amplifier 57. Output 58 is a voltage pulse train signal, the frequency of which is equal to the frequency of the full single phase commutation cycle.

Figure 6:
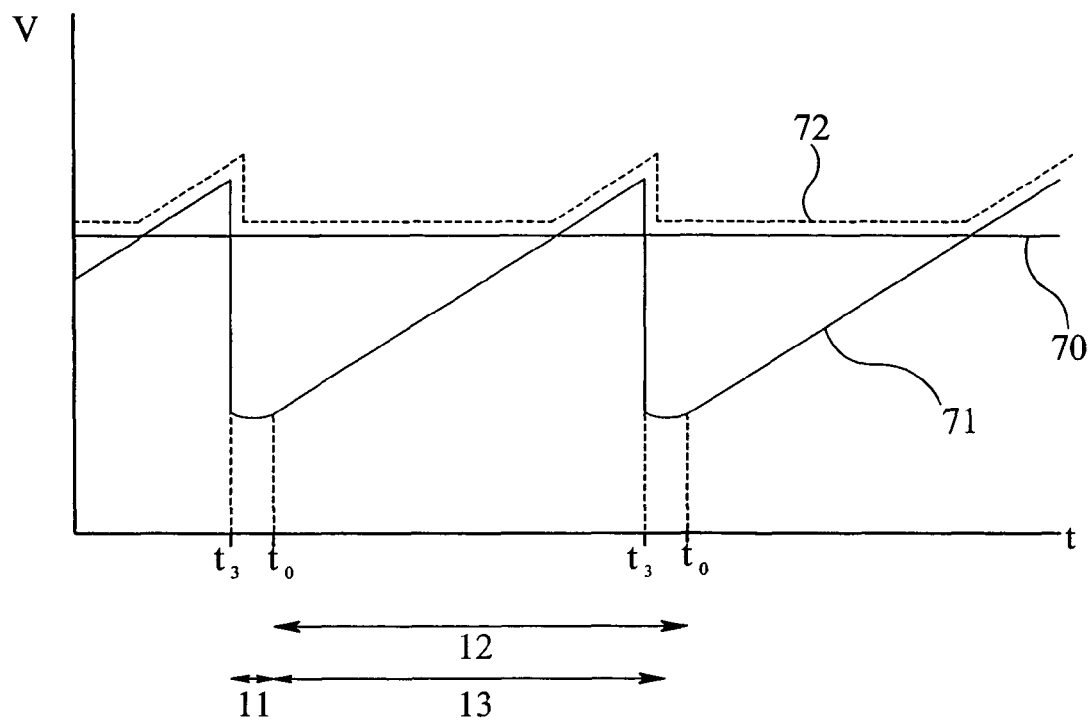
FIG. 6 illustrates the generation of a voltage waveform used to modulate the PWM signal in an embodiment of the invention.

As well as being supplied to commutation control circuit 49 as described above, Hall amplifier output 58 is also provided to an integrator circuit 60 and a saw tooth generator 61. With reference to FIG. 6, integrator 60 outputs a voltage waveform 70, which is substantially a DC voltage, whose magnitude is proportional to the rotational speed of the rotor 2. Saw tooth generator 61 outputs a substantially saw tooth waveform 71 at double the frequency of the pulse train signal output from the Hall amplifier 57. Saw tooth waveform 71 starts at its lowest point at $t_3$, i.e. at the end of a drive portion 13 of a commutation cycle. There is then a short flattened portion corresponding to the commutation delay 11, before waveform 71 begins to rise at a substantially steady rate throughout the next drive portion (of the same, or a subsequent commutation cycle) to point $t_3$.

The outputs of integrator 60 and saw tooth generator 61 are passed to level detector 62 which gives an output 72 on control line 63 which at any moment is equal to the greater of waveforms 70 and 71. Waveform 72 is equal to the saw tooth signal 71 where it crosses above DC level 70, and DC level 70 at all other times. The portion of waveform 72 where it assumes the saw tooth waveform corresponds to that part of the drive portion of the commutation cycle during which it is desired to back off the pulse width modulation such that the average voltage applied across the stator windings is reduced, so as to actively reduce winding current. Waveform 72 is thus a current reduction control signal.

The current reduction control waveform on line 63 may be combined with other signals controlling the output of the pulse width modulator 33, for instance a speed control input 34 in combiner 64. The effect of this additional control signal on line 63 is to progressively back off the PWM switching signal output on line 35 being provided to phase drive and control circuit 48 during an end portion of a drive portion of a commutation cycle.

The PWM switching signal output 35 is backed off by reducing the duty cycle of the PWM signal. The effect of an increased speed control input is a reduced duty cycle over the whole of the commutation cycle. The effect of an increase in the current reduction control signal is to reduce the duty cycle of the PWM switching signal. This has the effect of reducing the average voltage applied across the stator windings and therefore reducing the current flowing through the stator windings. Alternatively, the pulse width modulator 33 may be arranged such that reducing either the speed control input 34 or the current reduction control signal 63 reduces the duty cycle of the PWM switching signal.

Current reduction control signal 72 remains steady during the initial portion of each drive portion of the commutation cycle before beginning to ramp up linearly towards the end of the drive portion. Consequently, for an end portion of each drive portion of the commutation cycle it begins to reduce the average current flowing through the stator windings. The average current may be reduced to zero by or before the end of the drive portion (i.e. the time when all of the H-bridge switching devices are opened to remove current drive from the winding). There may be a gap between the initial portion and the end portion of each duty cycle. In particular, the initial portion may be considered to be only the initial portion of the drive portion during which the current flowing through the stator winding is rising to its initial peak. Similarly, the end portion of the duty cycle may be considered to be only the end portion of the duty cycle during which the magnitude of the stator winding current is being actively reduced.

Figure 7:
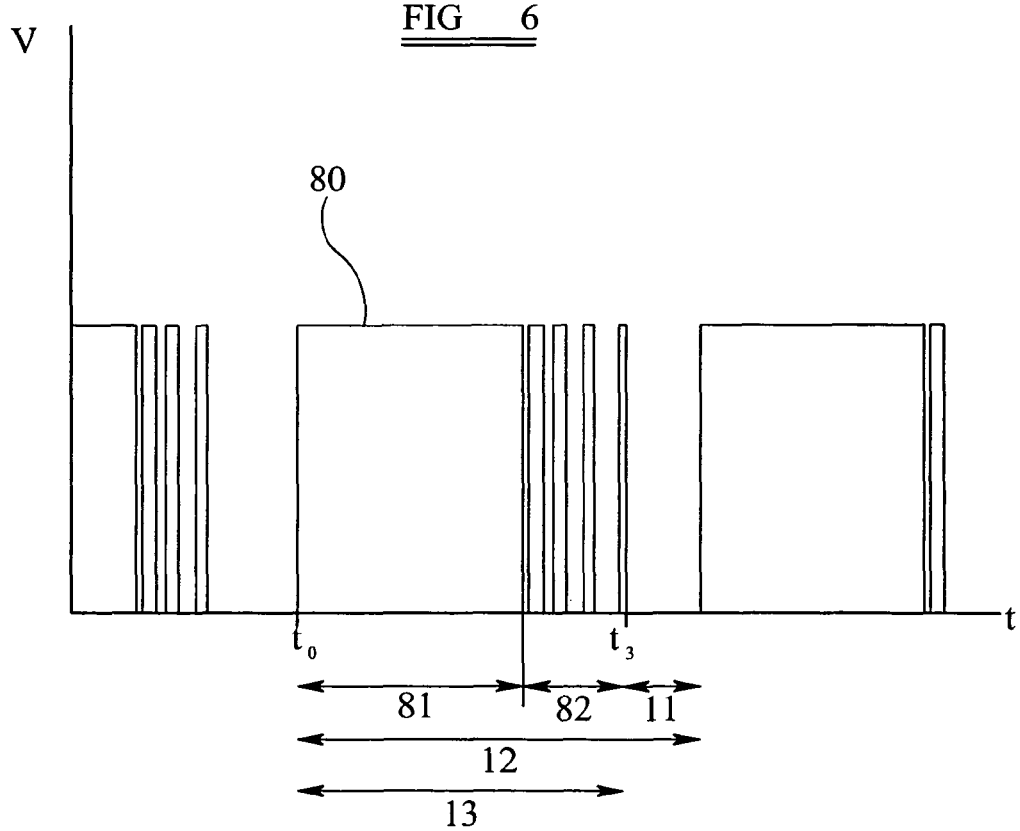
FIG. 7 illustrates the voltage waveform used to drive the H-bridge controlling current flowing through the stator windings, in an embodiment of the invention.

The duty cycle of the PWM output 35 is reduced during the period for which signal 72 rises above the DC level 70, the reduction being in proportion to the magnitude of signal 72. FIG. 7 illustrates schematically the PWM signal 80 provided to the phase drive and control circuit 48 on line 35. For the first part 81 of the drive portion 13 of commutation cycle 12 the voltage signal being supplied to the H-bridge 37 is shown as being constantly on. This represents a motor running at full speed, with PWM duty cycle at 100%. However, it will be appreciated that if the motor is required to run at a lower speed then during period 81 signal 80 may be modulated to reduce the average current (i.e. the duty cycle may be less than 100%). In the second part 82 of the drive portion 13 of the commutation cycle 12, the PWM duty cycle is progressively reduced. As before, there is a commutation delay 11 before the next drive portion, with the current being reversed through the stator windings.

Figure 8:
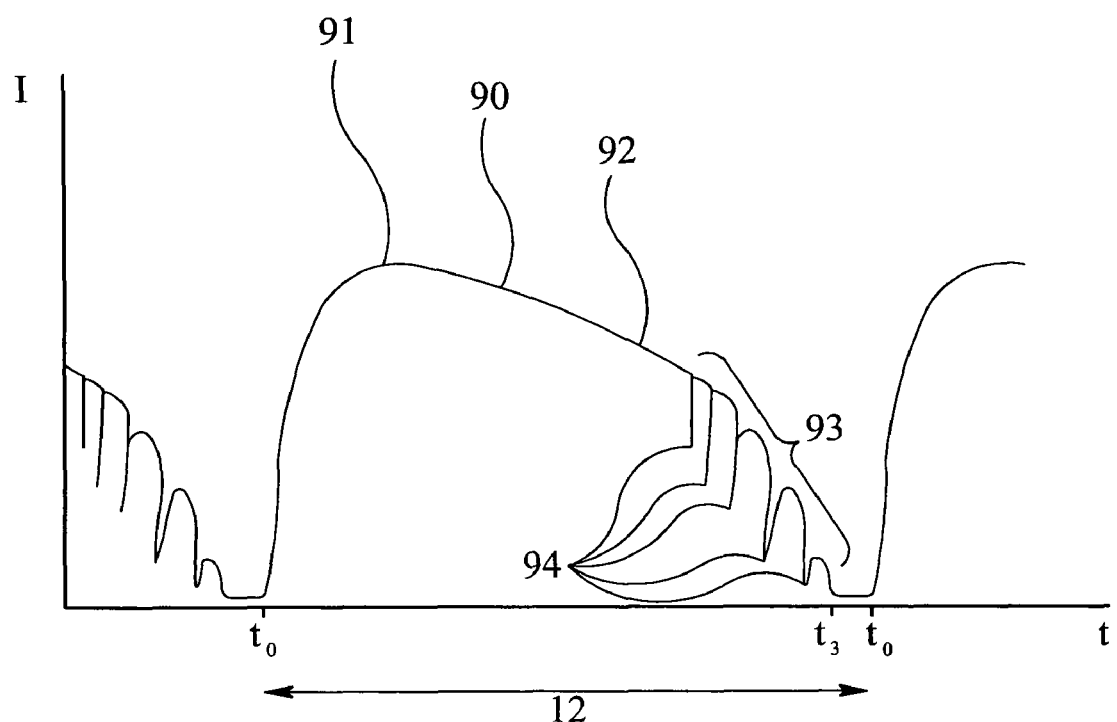
FIG. 8 illustrates the current passing through the stator windings of a brushless DC motor, controlled using a method in accordance with the present invention.

FIG. 8 illustrates the current 90 flowing through the stator windings of a DC brushless motor during each drive portion of each commutation cycle when controlled using the combined circuits of FIGS. 4 and 5. As before, there is a peak 91 during the early part of the drive portion of the commutation cycle. As with the unmodified waveform, the current begins to fall back at point 92 as the poles of the stator and the rotor move further apart. This represents an intermediate, or middle, part of the drive portion in which winding current is being passively reduced, in the sense that drive is constant, and current magnitude is reducing only as a result of inductance changes. The passive change in current magnitude is not a result of any controlling action or step (i.e. change in any control parameter). Then, however, rather than current increasing towards the end of the drive portion, the current falls back progressively towards zero as indicated over the portion 93 of the waveform. This portion 93 is the end portion in which current magnitudes is actively reduced (i.e. by changing a control parameter).

As the duty cycle of PWM modulated switching signal reduces individual peaks and troughs 94 in current 90 become evident, which are not readily detectable when the duty cycle is higher. However, it is the average current flowing at any one time that is important, and it may be readily seen that this progressively reduces before the end of the drive portion, at $t_3$. The magnitude of the individual peaks and troughs 94 are increased due to the fact that the current 90 is measured at the ground return of the H-bridge. This effect is dependent upon the size of capacitor connected across the H-bridge. The current variations 94 within the stator windings are smaller due to recirculating currents.

Figure 9:
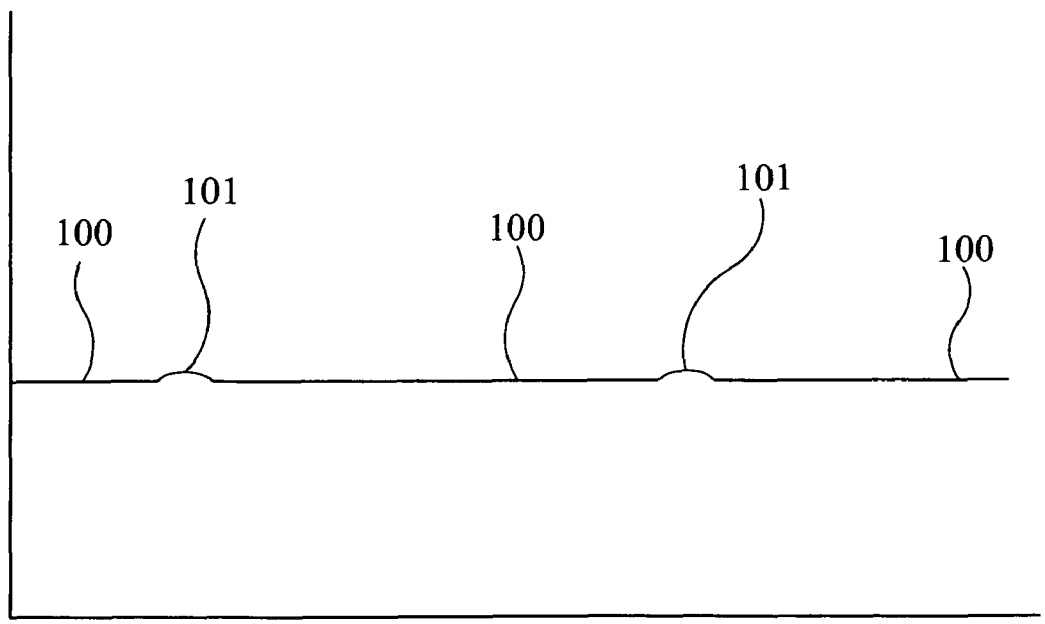
FIG. 9 illustrates the voltage on a supply to the brushless DC motor, whose winding current variation with time is shown in FIG. 8.

FIG. 9 illustrates the voltage on a supply 100 to a brushless DC motor according to an embodiment of the present invention. It is clear that the pulses 101 on the supply line corresponding to commutation points at the ends of the drive portions are much reduced compared with the unmodified motor, the voltage supply for which is shown in FIG. 3. If the stator winding current is reduced completely to zero before the end of each drive portion of the duty cycle then the voltage spikes will be removed entirely.

As the current during part 93 of the commutation cycle is actively backed off, there is a reduction in the average current drawn by the motor. A reduction in average current drawn by the motor of around 10% or better over the full commutation cycle has been achieved by implementing a method embodying the current invention. However, as the later part of the drive portion of the commutation cycle is inefficient in terms of transferring energy to the rotating rotor 2, the reduction in average speed over the whole commutation cycle is significantly less, or even approximately zero. Consequently, a motor controlled by a controller in accordance with the present invention is significantly more efficient than an unmodified brushless DC motor.

Figure 10:
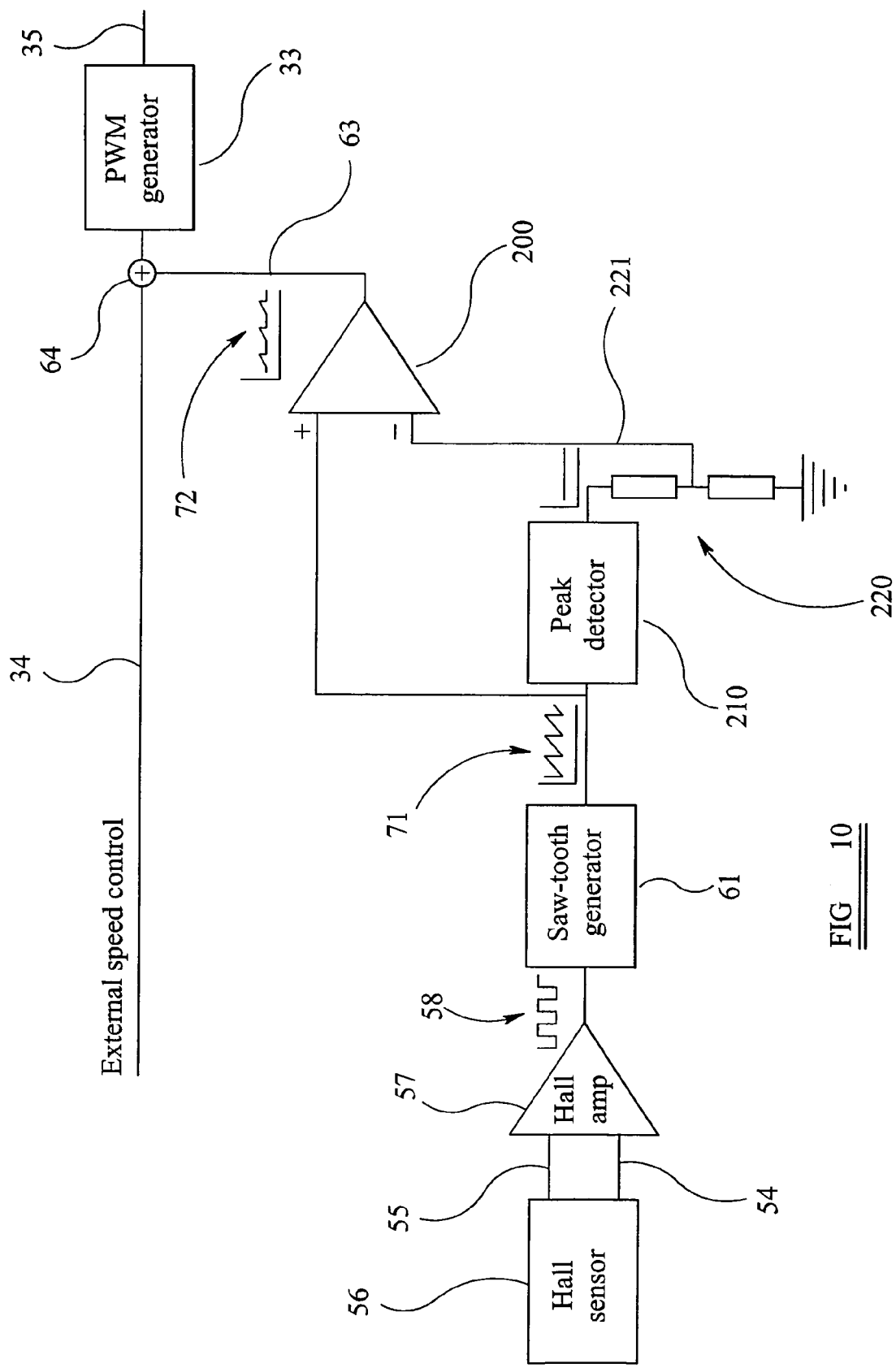
FIG. 10 illustrates another control circuit which may be used in embodiments of the invention to achieve active reduction in stator winding current towards the end of each drive portion.

Referring now to FIG. 10, this illustrates another control circuit (or control system) which may be used in embodiments of the invention to achieve active reduction in stator winding current towards the end of each drive portion 13 of a commutation cycle 12. As in the circuit of FIG. 5, this arrangement uses a Hall sensor 56 whose outputs 55, 54 are supplied to a Hall amplifier 57. The output 58 from the Hall amplifier 57 is substantially a square wave. However, rather than this square wave output 58 being supplied to an integrator and a saw-tooth generator as in FIG. 5, in the example shown in FIG. 10 square wave output 58 is supplied just to a saw-tooth generator 61 and a commutation control circuit (not illustrated in the figure). The saw-tooth generator 61 generates a saw-tooth output signal 71 from the square wave input. The substantially saw-tooth wave form 71 output from the generator 61 is supplied to one input (in this example the non-inverting input) of a differential amplifier 200, and to a peak detector 210. The peak detector output 211 is a DC signal whose magnitude corresponds to the peak height of the saw-tooth signal and hence is proportional to the rotational speed (i.e. angular velocity) of the rotor. The peak detector output 211 is divided down using a potential divider 220, and the divided down signal 221 is supplied to the other input (in this example the inverting input) of the amplifier 200. The output 72 (on line 63) of the amplifier 200 has the approximate form shown in the figure. This wave form comprises substantially flat portions, corresponding to the times when the saw-tooth generator output voltage is less than the divided down signal 221 from the peak detector output 211, and a series of peaks above that base level, corresponding to those times when the saw-tooth generator output voltage 71 exceeds the divided down voltage 221 derived from the peak detector output 211. The peak detector output voltage 211 shifts up and down according to rotor speed and in proportion to the peak voltage of the saw-tooth signal 72. Thus it will be appreciated that the output waveform 72 has substantially the same proportion of flat portion to peak saw-tooth portion regardless of the speed of rotation of the motor. This gives the control circuit in FIG. 10 some superiority over that shown in FIG. 5 where the saw-tooth signal 71 and integrator signal 70 are generated and may vary independently. The current reduction control signal 72 in the circuit of FIG. 10 may then be combined with a motor speed control signal 34 (which may also be referred to as a speed demand signal) and used to control a PWM generator 33. The basic duty cycle of the PWM signal output from the generator 33 is determined by the speed control signal 34. However, the effect of combining the speed control signal 34 with the current reduction control signal 72 is that the duty cycle of the PWM output 35 is progressively reduced during the end portion of each drive portion, i.e. at times corresponding to the positions of the peaks on the current reduction control signal 72.

Conveniently, in certain embodiments of the invention the Hall amplifier 57, the saw-tooth generator 61, the peak detector 210, and the differential amplifier 200 are integrated on a single control chip.

It will be appreciated that the circuit of FIG. 10, by employing a peak detector 210 rather than an integrator 60 (as was the case in the circuit of FIG. 5), provides the advantage that the substantially DC voltage waveform 221 tracks in proportion to the peak of the saw-tooth waveform 71.

By reducing the magnitude of current and voltage spikes generated at the end of the drive portion(s) of the commutation cycle, and in some cases by avoiding these spikes altogether, embodiments of the invention provide the advantage that it is no longer necessary to use over specified components, resulting in motors that are cheaper to make and more efficient due to the reduced internal losses within, for instance, the transistors forming the H-bridge.

As the current and voltage spikes are substantially reduced, and may be absent completely, a motor controlled (commutated) in accordance with the present invention is quieter than a motor controlled according to the prior art as audible clicks caused by rapid changes in energy within the stator 1 and the rotor 2 are reduced.

As an alternative to controlling the current in the later part of the drive portion of the commutation cycle by utilising the PWM control circuit, the current may be progressively reduced by placing a linear component having a variable resistance in series with the stator windings 3 in accordance with a further embodiment of the present invention. This may be a variable resistor or transistor, or any other suitable component or circuit as is known in the art. Means are provided to detect the speed and the position of the motor, and typically this will comprise a similar arrangement of Hall effect sensor, Hall amplifier, integrator and saw tooth generator as discussed above. However, in place of passing the resultant control signal to PWM circuitry, the control signal will be provided to circuitry controlling the resistance of the component in series with the stator windings.

Any other means of progressively reducing a current known in the art may be substituted for either of the above-described techniques. The controller may be formed from a single integrated circuit, with inputs and outputs to control the operation of the H-bridge, or the controller and the H-bridge may be combined into a single integrated circuit. Alternatively, the controller may be formed from discrete components and control circuits.

The apparatus and methods embodying the invention and described in detail above are particularly applicable to the control of single phase brushless DC motors. However, the present invention may be applied to any form of brushless DC motor. It is particularly applicable to single and two phase motors, as it is for these types of motors that the problems of excessive current and voltage spikes are particularly significant, but may also be applied to the control of motors having more than two phase windings.

Although the present invention has been primarily described above in connection with brushless DC motors, it will be readily apparent to the appropriately skilled person that the invention may also be applicable for control of an actuator comprising a stator, having at least one stator winding, and an armature (e.g. a plunger) arranged to move (e.g. linearly) with respect to the winding. The armature may, for example, comprise an elongate permanent magnet disposed within the winding, such that it may move linearly along the axis of the winding. By driving current through the winding in accordance with the above teaching controlled motion of the armature may be achieved. In particular, by applying a voltage having a drive portion during an end portion of which the voltage is progressively reduced, across the winding stepped motion of the plunger may be achieved. This is in contrast to normal actuators of this sort for which the current through the winding is either fully on or fully off, thereby only allowing the plunger to be moved from one extreme of its range of motion to the other, dependent upon the sense in which the voltage is applied across the winding.

It will be readily apparent to the appropriately skilled person that although the present invention has been described in terms of controlling the flow of current through the stator windings of a brushless DC motor, the same techniques may be used to control the flow of current through other inductive loads. In particular, the present invention has particular utility in applications where the problems of current and voltage spikes when the current is switched off are significant.

It will also be appreciated that the terms "winding" and "windings", although encompassing structures formed from wire, are not limited to such structures. The stator winding(s) may comprise other forms of conductor arranged to provide suitable current paths. As just one example of alternative arrangements, a winding may be provided by a conductive track on a printed circuit.

Other modifications, and applications, of the present invention will be readily apparent to the appropriately skilled person, without departing from the scope of the appended claims.

The invention claimed is:

1. A method of controlling a brushless DC motor of the type having a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor, the method comprising the steps of:
    driving current through the stator winding to generate a stator magnetic field to interact with the rotor magnetic field;
    detecting rotor position with respect to the stator; and
    cyclically commutating the stator winding current according to rotor position as the rotor rotates, each commutation cycle including a drive portion during which current is driven through the stator winding in one sense and at the end of which the driving of current in said sense is ceased,
    wherein the method further comprises the steps of:
    during an initial portion of each drive portion, driving current through the winding such that the magnitude of the winding current increases; and
    during an end portion of each drive portion, actively reducing the magnitude of the winding current.

2. A method in accordance with claim 1, wherein the step of actively reducing comprises reducing the magnitude of the winding current such that its value at the end of the drive portion is less than 30% of the average value of winding current magnitude during the drive portion.

3. A method in accordance with claim 1, wherein the step of actively reducing comprises reducing the magnitude of the winding current substantially to zero by the end of the drive portion.

4. A method in accordance with claim 1, wherein the step of driving current during the initial portion comprises increasing the magnitude of winding current to a peak value during said initial portion, and the step of actively reducing comprises reducing the magnitude of the winding current below said peak value.

5. A method in accordance with claim 4, wherein the step of actively reducing comprises reducing the magnitude of the winding current such that its value at the end of the drive portion is less than 30% of said peak value.

6. A method in accordance with claim 1, comprising the step of controlling winding current during each drive portion such that the magnitude of the winding current increases from substantially zero, at the beginning of the initial portion, up to a peak value, and then decreases substantially continuously from said peak value throughout the remainder of the drive portion, to the end of the end portion.

7. A method in accordance with claim 1, further comprising the steps of detecting rotor speed and adjusting the length of the end portion, during which winding current is actively reduced, according to rotor speed.

8. A method in accordance with claim 7, wherein the step of adjusting the length of the end portion according to rotor speed comprises reducing the length of the end portion as rotor speed increases.

9. A method in accordance with claim 1, wherein the step of actively reducing further comprises the steps of generating a current reduction control signal indicative of the desired current reduction during the end portion from a signal indicative of the position of the rotor; and reducing the magnitude of the winding current in response to the current reduction control signal.

10. A method in accordance with claim 9, wherein generating the current reduction control signal comprises providing rotor position sensing means to provide the signal indicative of the position of the rotor.

11. A method in accordance with claim 10, wherein the rotor position sensing means comprises:
    a Hall effect sensor arranged to detect the position of the rotor; and
    a Hall amplifier, an output of said Hall effect sensor being input to said Hall amplifier, the Hall amplifier outputting a pulse signal indicative of the position of the rotor.

12. A method in accordance with claim 10, wherein generating the current reduction control signal further comprises providing:
    an integrator adapted to provide an integrated voltage signal proportional to the rotational speed of the rotor in response to the Hall amplifier output;
    a saw tooth generator adapted to provide a saw tooth signal, having a frequency equal to the frequency of the commutation cycle in response to said Hall amplifier output; and
    a level detector adapted to provide said current reduction control signal, said current reduction control signal equalling whichever is the larger of the integrated voltage signal and the saw tooth signal.

13. A method in accordance with claim 12, wherein the step of actively reducing the magnitude of the winding current comprises reducing a drive voltage applied across the winding, wherein the drive voltage is a PWM voltage, and the step of reducing the drive voltage applied across the winding comprises reducing a duty cycle of the PWM voltage, the method further comprising providing a pulse width modulator adapted to provide a pulse width modulated switching signal; and
    phase drive means adapted to supply the switching signal to switching elements controlling the winding current in response to a commutation signal, such that the commutation signal is adapted to control the direction of winding current and the timing of each drive portion, and during each drive portion the average current within the stator windings is dependent upon said switching signal; wherein the current reduction control signal is input to the pulse width modulator, the pulse width modulator reducing the duty cycle of the switching signal towards the end of each drive portion in response to the current reduction control signal.

14. A method in accordance with claim 13, wherein said pulse width modulator further comprises a speed control signal input, the speed control signal being adapted to be indicative of a desired speed of rotation of a brushless DC motor, the pulse width modulator varying the duty cycle of the switching signal during each drive portion in response to the speed control signal.

15. A method in accordance with claim 14, wherein the current reduction control signal is combined with the speed control signal before the resultant signal is input to the pulse width modulator.

16. A method in accordance with claim 1, wherein the step of actively reducing the magnitude of the winding current comprises reducing a drive voltage applied across the winding.

17. A method in accordance with claim 16, wherein the drive voltage is a PWM voltage, and the step of reducing the drive voltage applied across the winding comprises reducing a duty cycle of the PWM voltage.

18. A method in accordance with claim 1, wherein the step of actively reducing comprises providing a component having a controllable variable resistance in series with the stator windings and increasing said variable resistance.

19. A method in accordance with claim 18, wherein the component comprises a variable resistor.

20. A method in accordance with claim 18, wherein the component comprises a transistor having a variable resistance.

21. A method of running a brushless DC motor, of the type having a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor, at substantially constant speed, the method comprising controlling the motor using a method in accordance with claim 1.

22. Control apparatus for a brushless DC motor, of the type comprising a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor, the control apparatus comprising:
a current drive adapted to drive current through the stator winding to generate a stator magnetic field;
a rotor position detector adapted to provide a rotor position signal; and
commutation apparatus adapted to cyclically commutate the stator winding current according to the rotor position signal as the rotor rotates, each commutation cycle including a drive portion in which the current drive is adapted to drive current through the stator winding in one sense and at the end of which the current drive is adapted to cease current drive;
wherein the control apparatus is further arranged to increase the current through the winding during an initial portion of each drive portion and to actively reduce the current through the winding during an end portion of each drive portion.

23. Control apparatus in accordance with claim 22, wherein the rotor position detector is arranged to detect the rotor magnetic field.

24. Control apparatus in accordance with claim 22, wherein the current drive is arranged to drive current through the stator winding by applying a PWM voltage across the winding, and the control apparatus is arranged to actively reduce the current through the winding during the end portion of each drive portion by reducing the duty cycle of the PWM voltage.

25. The combination of control apparatus in accordance with claim 22 and a brushless DC motor comprising a stator, comprising a stator winding excitable to generate a stator magnetic field, and a rotor, arranged to rotate with respect to the stator and comprising permanently magnetised material arranged to generate a rotor magnetic field to interact with the stator magnetic field to produce rotation of the rotor.

26. A method of controlling an actuator of the type having a stator, comprising a stator winding excitable to generate a stator magnetic field, and an armature, arranged to move with respect to the stator and comprising permanently magnetised material arranged to generate an armature magnetic field to interact with the stator magnetic field to produce movement of the armature, the method comprising the steps of:
driving current through the winding to generate a stator magnetic field to interact with the armature magnetic field;
detecting armature position with respect to the stator; and
commutating the winding current according to armature position as the armature moves, the commutation including a drive portion during which current is driven through the winding in one sense and at the end of which the driving of current in said sense is ceased,
wherein the method further comprises the steps of:
during an initial portion of the drive portion, driving current through the winding such that the magnitude of the winding current increases; and
during an end portion of the drive portion, actively reducing the magnitude of the winding current.

* * * * *